US009621730B2

(12) United States Patent
Yu et al.

(10) Patent No.: US 9,621,730 B2
(45) Date of Patent: Apr. 11, 2017

(54) METHOD AND APPARATUS FOR NOTIFICATION OF MESSAGE RECEPTION ACCORDING TO PROPERTY OF RECEIVED MESSAGE

(71) Applicant: Samsung Electronics Co., Ltd., Gyeonggi-do (KR)

(72) Inventors: Bohyun Yu, Gyeonggi-do (KR); Dongjin Koh, Seoul (KR); Sunghyuk Shin, Gyeonggi-do (KR); Suha Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/273,276

(22) Filed: May 8, 2014

(65) Prior Publication Data

US 2014/0335832 A1    Nov. 13, 2014

(30) Foreign Application Priority Data

May 9, 2013  (KR) .................. 10-2013-0052694

(51) Int. Cl.
*H04M 3/537* (2006.01)
*H04M 3/42* (2006.01)
*H04M 3/533* (2006.01)
*H04L 12/58* (2006.01)
*H04W 4/12* (2009.01)

(52) U.S. Cl.
CPC ............ *H04M 3/537* (2013.01); *H04L 51/24* (2013.01); *H04L 51/36* (2013.01); *H04M 3/42382* (2013.01); *H04M 3/5335* (2013.01); *H04W 4/12* (2013.01)

(58) Field of Classification Search
CPC .................. H04M 3/537; H04W 4/12
USPC ..... 455/412.1, 412.2, 414.1, 415, 404.1, 466
See application file for complete search history.

(56) References Cited

U.S. PATENT DOCUMENTS

| | | | |
|---|---|---|---|
| 6,112,096 | A | 8/2000 | Hasegawa |
| 6,728,349 | B2 | 4/2004 | Chang et al. |
| 6,751,485 | B2 | 6/2004 | Ranta |
| 6,799,017 | B1 | 9/2004 | Kregel |
| 6,871,214 | B2 | 3/2005 | Parsons et al. |
| 6,882,828 | B1 | 4/2005 | Kregel |
| 6,906,701 | B1 | 6/2005 | Oueslati et al. |
| 7,349,687 | B2 | 3/2008 | Murri et al. |
| 7,783,283 | B2 | 8/2010 | Kuusinen et al. |
| RE41,802 | E | 10/2010 | Kregel |
| 7,853,291 | B2 | 12/2010 | Choi |
| 8,032,161 | B2 | 10/2011 | Benco et al. |

(Continued)

FOREIGN PATENT DOCUMENTS

| | | |
|---|---|---|
| KR | 10-0420684 | 3/2004 |
| KR | 10-2004-0064151 | 7/2004 |

(Continued)

*Primary Examiner* — Cong Tran
(74) *Attorney, Agent, or Firm* — The Farrell Law Firm, P.C.

(57) ABSTRACT

A method and an apparatus for notification of a message reception according to a property of a received message are disclosed. A first terminal receives a message transmitted from a second terminal, determines a notification method corresponding to the received message based on a result of the analysis of the received message, and then outputs a notification signal according to the determined notification method.

38 Claims, 8 Drawing Sheets

(56) References Cited

U.S. PATENT DOCUMENTS

| | | | |
|---|---|---|---|
| 8,126,120 B2 | 2/2012 | Stifelman et al. | |
| 2004/0266402 A1* | 12/2004 | Schavitz | H04M 1/72547 455/412.2 |
| 2007/0143429 A1* | 6/2007 | Venkataraman | H04M 1/72547 709/206 |
| 2007/0238449 A1* | 10/2007 | Park | H04M 1/663 455/417 |
| 2007/0293211 A1* | 12/2007 | Yang | H04M 1/72555 455/420 |
| 2008/0025482 A1* | 1/2008 | Susama et al. | 379/88.22 |
| 2010/0246785 A1* | 9/2010 | Wang et al. | 379/88.23 |
| 2011/0213657 A1* | 9/2011 | O'Malley et al. | 705/14.49 |
| 2011/0294550 A1* | 12/2011 | Tsuchida | H04M 1/72552 455/566 |
| 2012/0028618 A1 | 2/2012 | Goel et al. | |
| 2012/0094642 A1 | 4/2012 | Popperl et al. | |
| 2013/0225214 A1* | 8/2013 | Enomoto | H04W 4/14 455/466 |
| 2013/0316744 A1* | 11/2013 | Newham et al. | 455/458 |
| 2013/0324093 A1* | 12/2013 | Santamaria | H04M 1/72519 455/414.1 |
| 2014/0057610 A1* | 2/2014 | Olincy | H04W 4/16 455/414.1 |

FOREIGN PATENT DOCUMENTS

| | | |
|---|---|---|
| KR | 10-2004-0106960 | 12/2004 |
| KR | 10-0899943 | 5/2009 |

\* cited by examiner

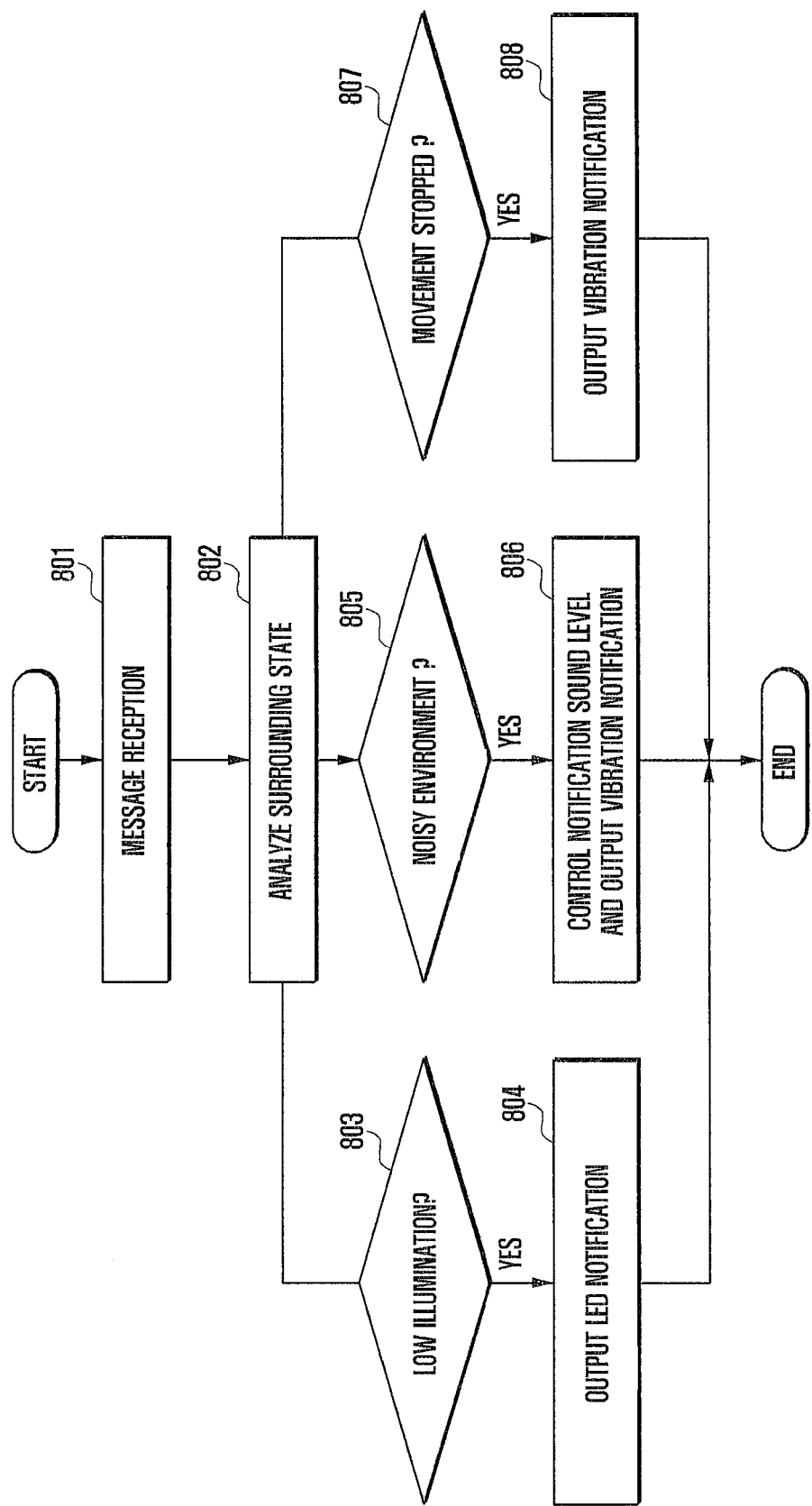

METHOD AND APPARATUS FOR NOTIFICATION OF MESSAGE RECEPTION ACCORDING TO PROPERTY OF RECEIVED MESSAGE

CROSS-REFERENCE TO RELATED APPLICATION(S) AND CLAIM OF PRIORITY

The present application is related to and claims priority from and the benefit under 35 U.S.C. §119(a) of Korean Patent Application No. 10-2013-0052694, filed on May 9, 2013, which is hereby incorporated by reference for all purposes as if fully set forth herein.

TECHNICAL FIELD

The present invention relates to a method and an apparatus for notification of a message reception according to a property of a received message, and more particularly, to a method of differently notifying reception of messages according to the properties of the messages received in a terminal.

BACKGROUND

In a message transmission and reception between terminals, a notification signal for notifying an arrival of a message has been generally configured as one type of common notification signal according to a state configuration of a terminal. That is, a notification method reflecting properties of messages, such as information on whether a received message is a response message to a previous message transmitted from a terminal or information on whether the content of a received message requires an urgent processing, has not been used.

In some cases, it can be possible to configure different notification methods according to the types of messages, such as a voice message, an E-mail, a Short Message Service (SMS) message, or a MultiMedia Service (MMS) message, or the types of applications related to the received messages. Further, in the case of normal phone call reception, it can be possible to configure different ringtones according to callers.

However, even in this case, since the notification method may not be configured according to the property of each message, only a rough type of a message or an application can be distinguished. Further, if the state of a terminal has been configured as a silent mode or a vibration mode, a notification method configured by the terminal itself can be employed regardless of a notification configuration corresponding to reception of a message. Therefore, distinguishing between notification methods can be meaningless.

SUMMARY

To address the above-discussed deficiencies, it is a primary object to provide a method and an apparatus, which can configure a notification method reflecting properties of received messages such as an important message, a message requiring the urgency, etc.

In accordance with an aspect of the present invention, there is provided a method for notification of a message reception by a first terminal according to a property of a received message. The method includes receiving a message transmitted from a second terminal. The method also includes analyzing the received message. The method further includes determining a notification method corresponding to the received message based on a result of the analyzing. The method includes outputting a notification signal according to the determined notification method.

In accordance with another aspect of the present invention, there is provided an apparatus for notification of a message reception by a first terminal according to the property of a received message. The apparatus includes a message reception unit configured to receive a message transmitted from a second terminal. The apparatus also includes a controller configured to analyze the received message, determine a notification method corresponding to the received message based on a result of the analysis, and output a notification signal according to the determined notification method.

According to a method and an apparatus for notification of a message reception based on a property of a received message, a specific notification method, instead of a notification method configured according to a type of a message, is configured according to a property of a received message, such as an important message or an urgent message. Therefore, it is possible to distinguish the property of a message and quickly identify the message by using only a notification signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 is an example diagram illustrating an operation of a first terminal according to this disclosure.

DETAILED DESCRIPTION

Figure 1:
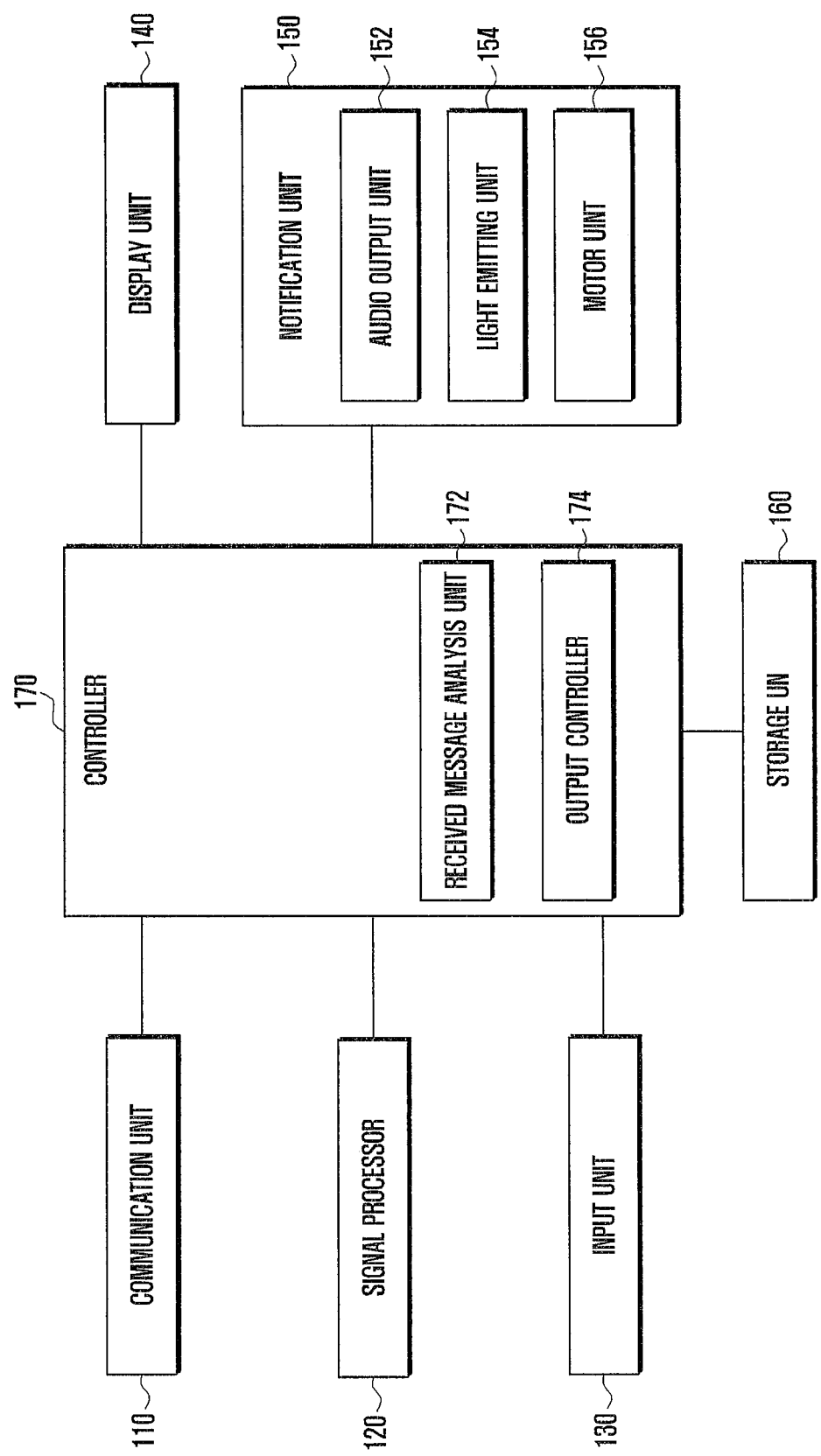
FIG. 1 is an example block diagram for describing an internal structure of a terminal according to this disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. Hereafter, various embodiments of the present invention will be described in detail with reference to the accompanying drawings. In this case, it should be understood that the same reference numerals are given to the same elements in the accompanying drawings. Further, a detailed description of known functions and configurations disclosed herein will be omitted when it may make the subject matter of the present invention rather unclear.

Further, although a main object of this disclosure will be a portable terminal such as a tablet PC, a smart phone, etc., which can be equipped with a touch-type display, a main subject matter of this disclosure can also be applied to the other terminals, in which similar techniques can be implemented, by slight modifications without significantly departing from the scope of this disclosure.

FIG. 1 is an example block diagram for describing an internal structure of a terminal according to this disclosure.

Referring to FIG. 1, the terminal can include a communication unit 110, a signal processor 120, an input unit 130, a display unit 140, a notification unit 150, a storage unit 160, and a controller 170.

The communication unit 110 can transmit and receive data for communication of the terminal. For example, the communication unit 110 can be configured with an RF transmitter, which can up-convert and amplify a frequency of a transmitted signal, and an RF receiver, which low noise can amplify a received signal and down-convert a frequency of the signal. Further, the communication unit 110 can receive data through wired and wireless channels, output the data to a controller 170, and transmit data received from the controller 170 through wired and wireless channels.

Further, the signal processor 120 can be configured with a codec, and can convert a digital signal to an analog signal, or an analog signal to a digital signal through the codec. In an embodiment, the signal processor 120 can process an input through an input unit 130 or a display unit 140 and transmit the processed input to the controller 170

The input unit 130 can receive a user's operation input for controlling a terminal, generate an input signal, and transmit the input signal to the controller 170. The input unit 130 can be implemented as a key pad device including a number key, a direction key, and the like, and a predetermined function key can be integrally formed with the display unit 140. Further, the input unit 130 including keys can be minimized or omitted when the display unit 140 is implemented as a touch-type display.

The display unit 140 can visually provide menus of a terminal, input data from a user or an outside, function configuration information, and various other pieces of information to users. The display unit 140 can perform a function of outputting a booting screen, a waiting screen, a menu screen, a communication screen, and other application screens of the terminal. Furthermore, the display unit 140 can display a message created in the terminal, a message received in the terminal, and a notification of a message reception, and provide a configuration screen to configure a notification method according to a property of a received message.

The display unit 140 can be a Liquid Crystal Display (LCD), an Organic Light Emitting Diode (OLED), an Active Matrix Organic Light Emitting Diode (AMOLED), a flexible display, 3D display and the like.

Meanwhile, the display unit 140 can include a touch sensor when the display unit 140 is implemented as a touch-type display. The touch sensor can convert a change of capacitance, and the like occurring in a specific site or pressure applied to a specific portion of the display unit 140 into an electrical input signal. In this case, the touch sensor can detect pressure at the time of touch as well as a touched position and area.

For example, the touch sensor provided at the display unit 140 can detect user's touch pressure, generate a sensing signal, and transmit the sensing signal to the controller 170. The sensing signal can include coordinate information of a part touched by the user. If the user moves (such as drags) the touch in a state in which the user touches and holds the display unit 140, the touch sensor can create a sensing signal including coordinate information of a moving path and transmit the created sensing signal to the controller 170.

The touch sensor can be configured with a touch sensor, such as a capacitive overlay sensor, a resistive overlay sensor, a surface acoustic wave sensor, an infrared beam sensor, or a pressure sensor. In addition to these sensors, all types of sensor devices, which can detect contact or pressure of an object, can be configured as the touch sensor.

The notification unit 150 can output a notification signal notifying an arrival of a received message according to the control of the controller 170. To this end, the notification unit 150 can include an audio output unit 152, a light emitting unit 154 configured with a light emitting display such as a Light Emitting Diode (LED), and a motor unit 156.

The audio output unit 152 can output a notification signal in a sound type, and the light emitting unit 154 can output a notification signal through a light emitting display such as a LED. In this case, a color of the notification signal, which is output through the light emitting display, can be varied according to the property of the received message. The motor unit 156 can output a notification signal of a vibration type. The notification signals can be outputted through the audio output unit 152, the light emitting unit 154, and the motor unit 156 described above, and the notification signal output through the display unit 140 can be used for notification of a message reception of a specific type. In this case, the respective notification signal can be used alone, or two or more notification signals can be used together. However, the types of the notification signals as described above are only some embodiments of the present invention, and this disclosure can include all possible types of the notification signals according to an implementation type of a terminal.

The storage unit 160 can store programs and data required in an operation of a terminal, and can be divided into a program region and a data region. The program region can store a program controlling the overall operation of the terminal, an operating system (OS) controlling the overall operation of a portable terminal, applications required for playing multimedia contents, applications required for other optional functions of the terminal, for example a voice conversation function, a camera function, a sound play function or an image or video play function, and the like. The data region can be an area for storing data, which can be created according to the use of the terminal or can be input from an outside, and can store an image file, a video file, an audio file, a document file, a message, and the like.

In an embodiment, the storage unit 160 can store a notification method, which can be configured according to the type of a received message. The notification method can be pre-configured during manufacturing of a terminal or can be configured by a user. Furthermore, the notification method can be changed in some cases.

The controller 170 can control the overall operation for components of a terminal. The controller 170 can also include a received message analysis unit 172 and an output controller 174.

The received message analysis unit 172 can analyze a message received from a terminal to identify whether a common notification method for notifying a reception of a general message is applied to the received message or whether a specific notification method configured in association with the received message exists, and determine a notification method for notifying an arrival of the received message based on a result of the identification. The output controller 174 can control the display unit 140 or the notification unit 150 to output a notification signal according to the determined notification method.

Figure 2:
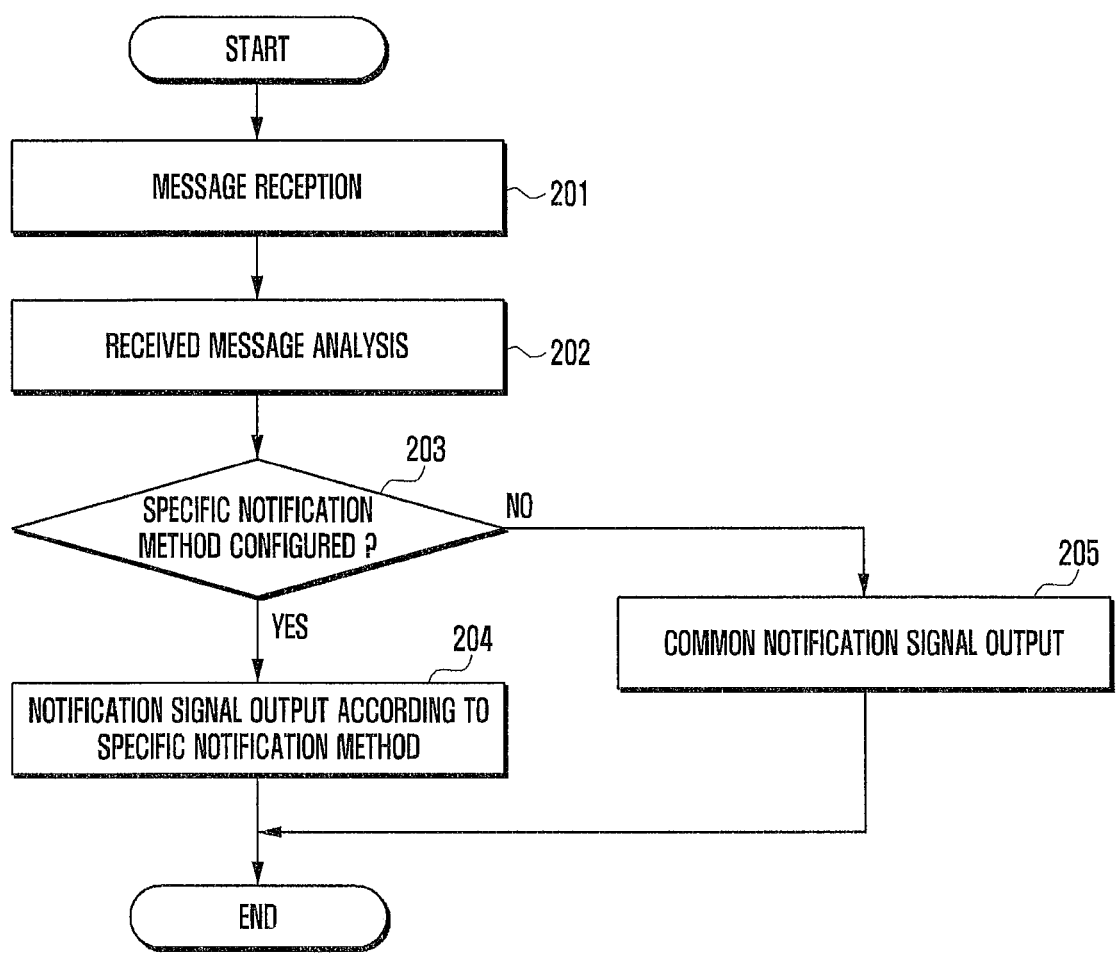
FIG. 2 is an example diagram illustrating a notification process of a message reception according to this disclosure.
Figure 3:
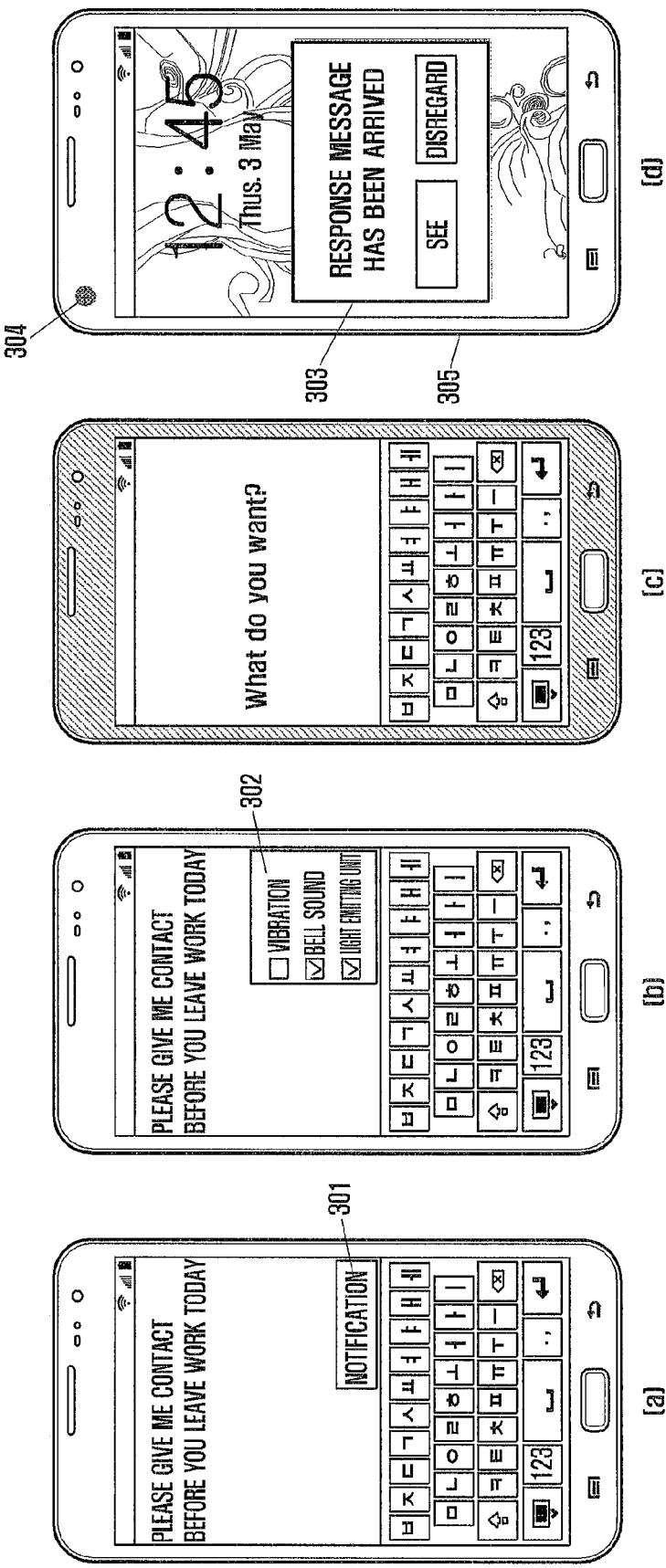
FIGS. 3A to 3D are example diagrams illustrating notification methods a cases in which a received message is a response message to a previously transmitted message according to this disclosure.

FIG. 2 is an example diagram illustrating a message reception notification process according to this disclosure. The process illustrated in FIG. 2 can be performed by a first terminal having received a message from a second terminal.

Referring to FIG. 2, the first terminal can receive a message from the second terminal in step 201. The received message can be a short message, a multimedia message, an email, or the like. Next, the first terminal can determine whether a common notification method, which is generally configured for a received message, is applied to the received message or whether a specific notification method, which can be configured specifically to a received message, exists, by analyzing the received message in step 202.

In step 203, the first terminal can determine a notification method for notifying the arrival of the received message according to whether the notification method, which can be specifically configured, exists in the received message based on a result of the analysis. If the specific notification method has been configured, the first terminal can output a notification signal according to the notification method configured in step 204. If the specific notification method is not configured, the first terminal can output a common notification signal in step 205.

Specific embodiments of a notification method according to an analysis result of a received message are described herein.

FIGS. 3A to 3D are example diagrams illustrating notification methods in cases in which a received message is a response message to a previously transmitted message according to this disclosure.

Referring to FIGS. 3A to 3D, a message to be transmitted from the first terminal to the second terminal can be created as illustrated in FIG. 3A. In this event, when it is necessary to quickly identify a response from the second terminal with respect to the created message or the message being created, the first terminal provides a notification configuration key 301 which allows a user to configure a specific method for being notified of the arrival of a response message from the second terminal.

When the user selects a notification configuration key 301 provided through the display unit 140, the first terminal displays a notification configuration menu 302 to allow the user to configures a specific method for notifying the user of the arrival of a response message from the second terminal, as shown in FIG. 3B. In the embodiment illustrated in FIGS. 3A to 3D, a notification method using a bell sound and a light emitting unit is configured as the specific method for notifying the user of the arrival of the response message.

When the response message is created in the second terminal as shown in FIG. 3C and is then transmitted to the first terminal, the first terminal notifies the user of the arrival of the response message by turning on the light emitting unit 304 and outputting the bell sound through a speaker 305 while displaying a message 303 notifying the user of the arrival of the response message through the display unit 140 as shown in FIG. 3D.

Figure 4:
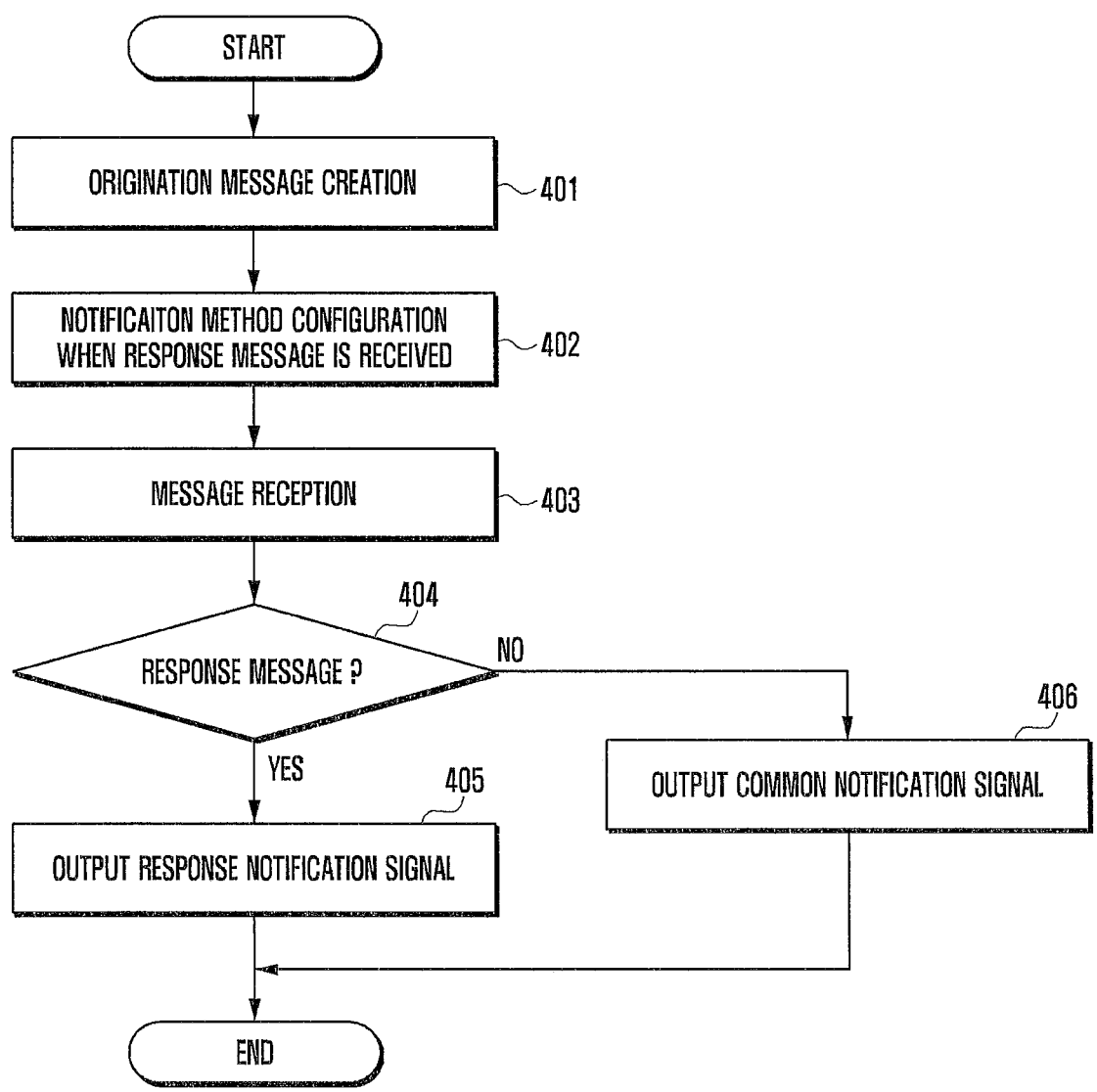
FIG. 4 is an example diagram illustrating an operation of a first terminal according to this disclosure.
Figure 5:
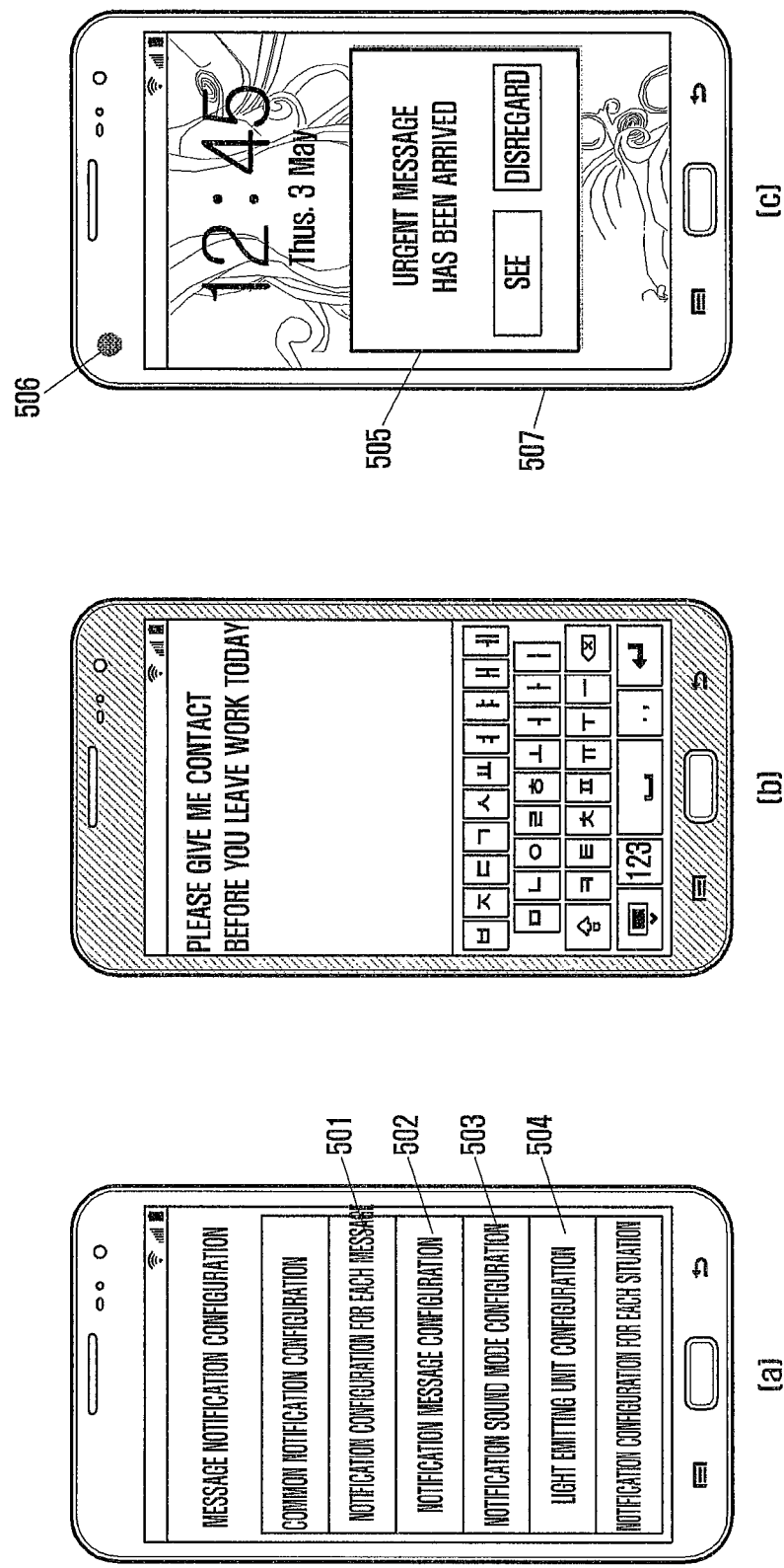
FIGS. 5A to 5C are example diagram illustrating notification methods in cases in which a received message is an urgent message according to this disclosure.

FIG. 4 is an example diagram illustrating an operation of a first terminal according to this disclosure. In an embodiment, the example operation illustrated in FIG. 4 can be implemented in terminals such as the terminals disclosed in FIGS. 3A to 3D.

Referring to FIG. 4, the first terminal can create an origination message to be transmitted to the second terminal in step 401, and configure a specific notification method for notifying a response message received from the second terminal in step 402.

Thereafter, if the first terminal receives a message in step 403, the first terminal can determine whether the received message is a response message from the second terminal, in step 404. The first terminal can determine that the received message is a response message, when the message has been originated from the second terminal and is received from the second terminal within a certain period of time after the message has been transmitted from the first terminal.

If it is determined that the received message is a response message, the first terminal can output a response notification signal according to a notification method configured in association with the response message, in step 405. Otherwise, in step 406, the first terminal can output a common notification signal according to a normal configuration of the first terminal itself.

Meanwhile, while the first terminal can configure the notification method at the time of creating an origination message, the first terminal can also receive a message having a specifically configured notification method from the second terminal. For example, while creating a message to be transmitted to the first terminal, the second terminal can configure a specific notification method when the second terminal determines that it is required for the first terminal to quickly identify the message.

The first terminal having received a message from the second terminal can analyze the received message to determine whether the received message includes a notification method configured specifically to the received message. Then, if the received message includes a specifically configured notification method, the first terminal can output a notification signal according to the notification method specifically configured by the second terminal regardless of the notification configuration of the second terminal itself.

FIGS. 5A to 5C are example diagrams illustrating notification methods in cases in which a received message is an urgent message.

Referring to FIGS. 5A to 5C, the first terminal can provide a message notification configuration menu so that a notification method can be configured according to the property of a received message as illustrated in FIG. 5A. The notification configuration menu can include a notification configuration menu 501 for each message, which can include menu items of a notification message configuration 502, a notification sound mode configuration 503, and a light emitting unit configuration 504 as detail configuration items.

The notification message configuration menu item 502 can allow configuration of contents or a display type of a notification message for notifying an arrival of a message displayed through the display unit 140. The notification sound mode configuration menu item 503 can allow at least one of sound, vibration and silence to be configured as a type of a notification sound. Further, a lighting cycle and color of a light emitting display, such as an LED, can be configured through the light emitting configuration menu item 504.

After the notification method in a case in which an urgent message is received is configured as described above, when a message reading, for example, "please give me contact before you leave work today" is received from the second terminal as illustrated in FIG. 5B, the first terminal can analyze the contents of the message through a processing such as Natural Language Understanding (NLU) for the received message. For example, when words such as "today", "fast", "quickly", or "contact" are included in the message or when it is determined that the message has an urgent content through a combination of words, the corresponding message can be determined as an urgent message.

If it is determined by understanding the context of the received message that the received message is the urgent message, the first terminal can notify the arrival of the urgent message as illustrated in FIG. 5C. As the notification method, an arrival notification message 505 notifying arrival of an urgent message can be an output through the display unit 140, a light emitting unit 506 can be turned on, or a notification signal can be output through a speaker 507.

Figure 6:
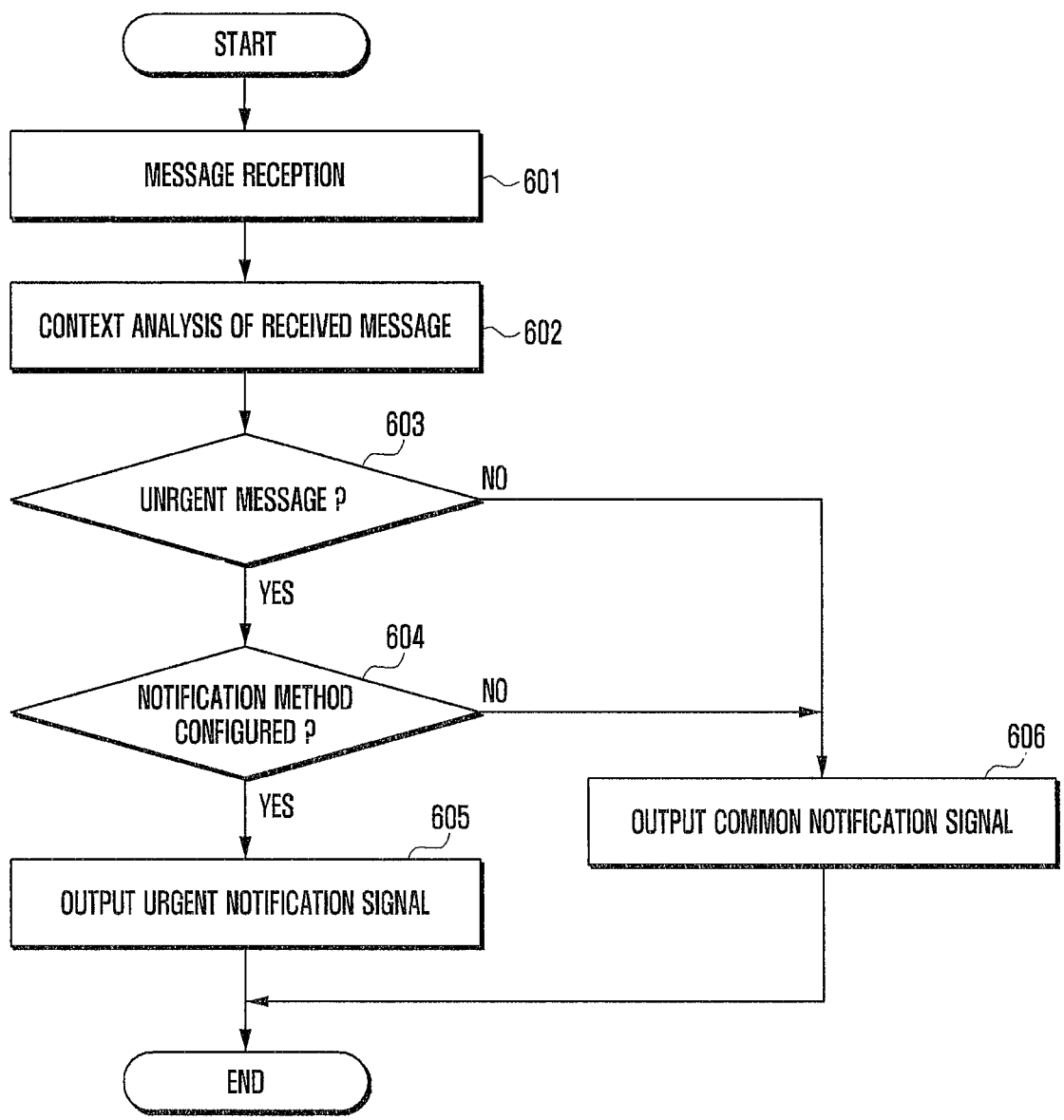
FIG. 6 is an example diagram illustrating an operation of a first terminal according to this disclosure.
Figure 7:
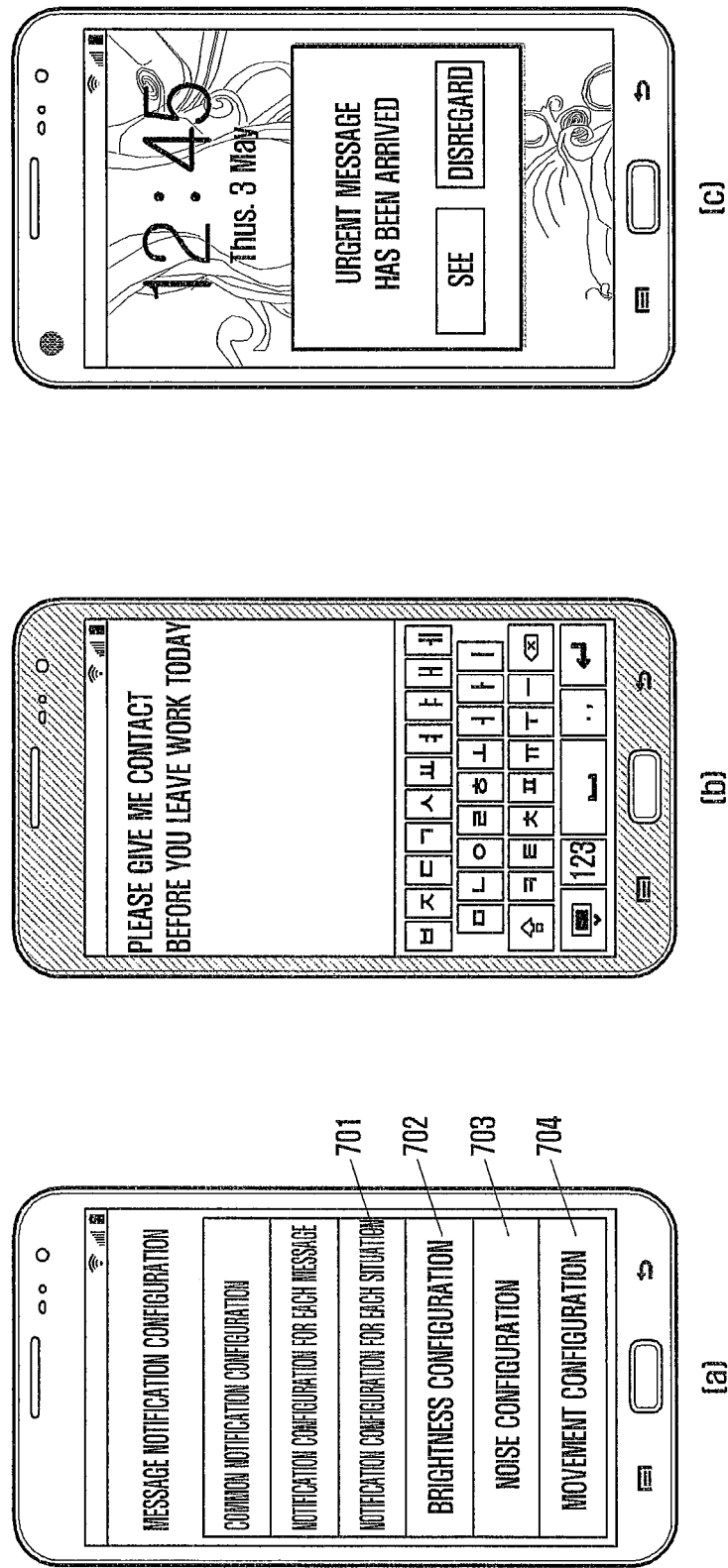
FIGS. 7A to 7C are example diagrams illustrating notification methods according to a surrounding environment of a terminal when a message is received according to this disclosure.

FIG. 6 is an example diagram illustrating an operation of a first terminal according to this disclosure. In an embodiment, the example operation illustrated in FIG. 6 can be implemented in terminals such as the terminals disclosed in FIGS. 5A to 5C.

Referring to FIG. 6, the first terminal can receive a message in step 601, and then analyze the context of the received message through natural language processing, etc. in step 602. As a result of the analysis, if it is determined in step 603 that the received message is an urgent message, the first terminal can determine whether a notification method in a case in which an urgent message was received has been configured in step 604.

When a specific notification method for an urgent message has been configured, the first terminal can output an urgent notification signal according to a configured notification method in step 605. However, when it is determined in step 603 that the received message is not an urgent message, or when it is determined in step 604 that a notification method for the reception of the urgent message has not been configured, the first terminal can output a common notification signal according to the configuration of the terminal itself in step 606.

FIGS. 7A to 7C are example diagrams illustrating notification methods according to a surrounding environment of a terminal when a message is received. The embodiment of FIGS. 7A to 7C can be applied together with the notification method according to an analysis result of a received message as described above, or prior to a notification method configured according to the property of a message.

Referring to FIGS. 7A to 7C, the first terminal can provide a message notification configuration menu 701 so that a notification method can be configured according to a surrounding environment of the terminal as illustrated in FIG. 7A. Further, a brightness configuration item 702, a noise configuration item 703, and a movement configuration item 704 can be included as detail configuration items of the notification configuration menu for each situation.

The brightness configuration item 702 can allow the notification method to be differently determined based on a detected illumination of the surrounding of the first terminal. To this end, an illumination sensor can be included in the first terminal. The noise configuration item 703 can allow the notification method to be differently determined based on a measured noise of the surrounding of the first terminal and can allow the notification method to be determined according to the level of noise input through a microphone included in the first terminal. The movement configuration item 704 can allow the notification method to be differently determined according to whether the first terminal is in a moving state or in a stopped state. To this end, an acceleration sensor can be included in the first terminal.

After the notification method is configured according to the surrounding situation of the terminal at the time of message reception as described above, when a message is received from the second terminal as illustrated in FIG. 7B, the first terminal can identify the surrounding situation of the first terminal while analyzing the received message as described above. Next, the first terminal can output a notification signal by further determining the notification method according to the surrounding situation of the first terminal simultaneously while determining the notification method according to the analysis of the received message as illustrated in FIG. 7C.

For example, when the current surrounding illumination measured by an illumination sensor of the first terminal is lower than a pre-configured reference illumination, even if a notification method through a light emitting unit is not included in the notification method determined according to the analysis of the received message, the first terminal can optionally add the notification method through the light emitting unit. Further, as a result of measurement of surrounding noise of the first terminal, if the level of the surrounding noise of the first terminal is higher than that of a pre-configured reference noise, the first terminal can increase the sound level of the notification signal when the notification by sound has been included in the notification method determined according to the received message analysis, and can optionally add the notification method using vibration. Furthermore, as a result of determining by an acceleration sensor whether the first terminal is moving, a notification method using sound can be determined if the first terminal is in a moving state, and a notification method using vibration can be determined if the first terminal is in a stopped state.

FIG. 8 is an example diagram illustrating an operation of a first terminal according to this disclosure. In an embodiment, the example operation illustrated in FIG. 8 can be implemented in terminals such as the terminals disclosed in FIGS. 7A to 7C.

As mentioned above, the process of FIG. 8 can be performed at the same time with the process of FIG. 4 or FIG. 6, or can be performed prior to the process of FIG. 4 or FIG. 6.

Referring to FIG. 8, the first terminal can receive a message in step 801, and then analyze a surrounding state of the first terminal in step 802.

If it is determined in step 803 that the surrounding illumination of the first terminal is lower than the reference illumination, the first terminal can further determine the notification method through an LED in step 804. If it is determined in step 805 that the level of the surrounding noise of the first terminal is higher than that of reference noise, the first terminal can control the level of the notification sound or further determine the notification method using vibration in step 806. As a result of the determination in step 807 on whether the terminal is moving, if it is determined that the terminal is stopped, the first terminal can further determine the notification method using vibration in step 808.

Those skilled in the art will recognize that the other specific embodiments of the present invention can be practiced without changing the technical spirit or the essential features of the present invention. Therefore, it is to be understood that the embodiments described above are for the purpose of describing an example and not of limitation in all aspects. The scope of the present invention is represented by the following claims rather than a detailed description described above, and it should be interpreted that all modification derived from the meaning and scope of the claims, and the equivalent concepts are included within the scope of the present invention.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for an electronic device, comprising:
   while displaying an outgoing message from the electronic device, displaying a visual user interface element associated with a notification setting for an arrival of a message related to the outgoing message, wherein the notification setting enables a specific notification to be output when the message related to the outgoing message is received by the electronic device; and
   setting the notification setting for the arrival of the message related to the outgoing message through a user input with respect to the visual user interface element.

2. The method of claim 1, wherein the outgoing message is being drafted.

3. The method of claim 1, further comprising:
   outputting the specific notification in response to the arrival of the message related to the outgoing message.

4. The method of claim 3, further comprising:
   outputting a normal notification when a message which is not the message related to the displayed outgoing message is received.

5. The method of claim 4, wherein the normal notification is different from the specific notification.

6. The method of claim 1, wherein the outgoing message comprises one of a short message, a multimedia message, and an email message.

7. The method of claim 1, wherein the message related to the outgoing message comprises a reply to the outgoing message.

8. The method of claim 1, wherein the specific notification comprises at least one of sound notification, haptic notification, and visual notification.

9. The method of claim 8, wherein the specific notification is configured according to one or more user-selected option.

10. A method for an electronic device, comprising:
    receiving a message by a communication unit of the electronic device;
    determining whether the message is related to specific outgoing message which was sent from the electronic device, the electronic device being set to output a specific notification in response to receiving a message related to the specific outgoing message;
    outputting the specific notification if the message is related to the specific outgoing message; and
    outputting a normal notification if the message is not related to the specific outgoing message.

11. The method of claim 10, wherein the normal notification is different from the specific notification.

12. The method of claim 10, wherein the message comprises a reply to the specific outgoing message, and also comprises one of a short message, a multimedia message, and an email message.

13. The method of claim 10, wherein the specific notification comprises at least one of a sound notification, a haptic notification, and a visual notification.

14. The method of claim 10, wherein a configuration of the specific notification is set according to one or more user-selected options.

15. The method of claim 10, wherein the electronic device is set, based on a user input associated with the specific outgoing message, to output the specific notification in response to receiving the message related to the specific outgoing message.

16. The method of claim 10, wherein the electronic device is set when the specific outgoing message is being drafted, based on a user input associated with the specific outgoing message, to output the specific notification in response to receiving the message related to the specific outgoing message.

17. An electronic device, comprising:
    a communication unit;
    a display unit;
    an input unit; and
    a controller configured to:
        while an outgoing message from the electronic device is displayed on the display unit, control the display unit to display a visual user interface element associated with a notification setting for an arrival of a message related to the outgoing message, wherein the notification setting enables a specific notification to be output when the message related to the outgoing message is received via the communication unit, and
        set the notification setting for the arrival of the message related to the outgoing message through a user input with respect to the visual user interface element.

18. The electronic device of claim 17, wherein the outgoing message is being drafted.

19. The electronic device of claim 17, further comprising:
    a notification unit,
    wherein the controller is configured to control the notification unit to output the specific notification in response to the arrival of the message related to the outgoing message.

20. The electronic device of claim 19, wherein the controller is configured to control the notification unit to output a normal notification when a message which is not the message related to the displayed outgoing message is received.

21. The electronic device of claim 20, wherein the normal notification is different from the specific notification.

22. The electronic device of claim 17, wherein the outgoing message comprises one of a short message, a multimedia message, and an email message.

23. The electronic device of claim 17, wherein the message related to the outgoing message comprises a reply to the outgoing message.

24. The electronic device of claim 17, wherein the specific notification comprises at least one of sound notification, haptic notification, and visual notification.

25. The electronic device of claim 24, wherein the specific notification is configured according to one or more user-selected option.

26. An electronic device, comprising:
a communication unit;
a notification unit; and
a controller configured to:
  determine whether a message received via the communication unit is related to a specific outgoing message which was sent from the electronic device, the controller being set to control the notification unit to output a specific notification in response to receiving a message related to the specific outgoing message;
  control the notification unit to output the specific notification if the received message is related to the specific outgoing message; and
  control the notification unit to output a normal notification if the received message is not related to the specific outgoing message.

27. The electronic device of claim 26, wherein the normal notification is different from the specific notification.

28. The electronic device of claim 26, wherein the message comprises a reply to the specific outgoing message, and also comprises one of a short message, a multimedia message, and an email message.

29. The electronic device of claim 26, wherein the specific notification comprises at least one of a sound notification, a haptic notification, and a visual notification.

30. The electronic device of claim 26, wherein a configuration of the specific notification is set according to one or more user-selected options.

31. The electronic device of claim 26, further comprising:
an input unit, wherein the specific notification in response to receiving the message related to the specific outgoing message is set by the controller based on a user input via the input unit associated with the specific outgoing message.

32. The electronic device of claim 26, further comprising:
an input unit,
wherein the specific notification is set by user input when the specific outgoing message is being drafted, via the input unit.

33. An electronic device, comprising:
a communication unit;
a display unit;
an input unit; and
a controller configured to:
  while an outgoing message from the electronic device is displayed on the display unit, control the display unit to display a visual user interface element associated with a notification setting for an arrival of a reply to the outgoing message, wherein the notification setting enables a specific notification to be output when the reply to the outgoing message is received via the communication unit, and
  set the notification setting for the arrival of the reply to the outgoing message through a user input with respect to the visual user interface element,
wherein the outgoing message comprises one of a short message, a multimedia message, and an email message, and
wherein the specific notification is configured according to one or more user-selected options and comprises at least one of sound notification, haptic notification, and visual notification.

34. The electronic device of claim 33, further comprising:
a notification unit,
wherein the controller is configured to control the notification unit to output the specific notification in response to the arrival of the reply to the outgoing message.

35. The electronic device of claim 34, wherein the controller is configured to control the notification unit to output a normal notification when a message which is not the reply to the displayed outgoing message is received.

36. An electronic device, comprising:
a communication unit;
a notification unit; and
a controller configured to:
  determine whether a message received via the communication unit is a reply to a specific outgoing message which was sent from the electronic device, the controller being set to control the notification unit to output a specific notification in response to receiving a reply to the specific outgoing message;
  control the notification unit to output the specific notification if the received message is a reply to the specific outgoing message; and
  control the notification unit to output a normal notification if the received message is not a reply to the specific outgoing message, wherein the normal notification is different from the specific notification,
wherein the specific outgoing message comprises one of a short message, a multimedia message, and an email message, and
wherein the specific notification is configured according to one or more user-selected options and comprises at least one of sound notification, haptic notification, and visual notification.

37. The electronic device of claim 36, wherein the specific notification output in response to receiving a reply to the specific outgoing message is set by user input associated with the outgoing message.

38. The electronic device of claim 36, wherein the specific notification is set by user input when the specific outgoing message is being drafted.

* * * * *